Patented Apr. 13, 1954

2,675,371

UNITED STATES PATENT OFFICE 2,675,371

POLYMERS OF ALPHA-SULFO AND SULFON-AMIDOMETHYL ACRYLONITRILES

Harry W. Coover, Jr., and Joseph B. Dickey, Kingsport, Tenn., assignors to Eastman Kodak Company, Rochester, N. Y., a corporation of New Jersey No Drawing. Application February 23, 1951, Serial No. 212,499

9 Claims. (Cl. 260—79.3)

This invention relates to alpha-sulfo and sulfonamidomethyl acrylonitriles, to polymers thereof, and to process for their preparation.

The new class of substituted methacrylonitrile compounds of our invention are represented by the following general structural formula.

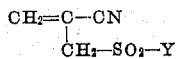

wherein Y represents an atom of chlorine, the group

wherein R represents an atom of hydrogen or an alkyl group containing from 1 to 4 carbon atoms (e. g. methyl, ethyl, propyl, butyl, etc. groups) and $R_1$ represents an alkyl group containing from 1 to 4 carbon atoms, the group

—$OR_1$ wherein $R_1$ has the above definition, and the group

—OX wherein X represents an atom of an alkali-metal (e. g. sodium, potassium, lithium, etc). The above defined compounds are valuable intermediates for the preparation of other organic compounds. They are all readily polymerizable alone or conjointly with one or more other unsaturates to resinous polymers of varying degrees of hardness and variable solubilities, but they are all soluble in volatile solvents. The harder polymers are also useful for the manufacture of molded objects.

It is, accordingly, an object of the invention to provide a new group of alpha-sulfo and sulfonamidomethyl acrylonitriles. Another object is to provide resinous polymers of the same. Another object is to provide a process for their preparation. Other objects will become apparent hereinafter.

In accordance with our invention, we prepare alpha-(chlorosulfonylmethyl)-acrylonitrile

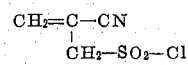

by the process of treating an α-chloro- or α-bromomethyl acrylonitrile dissolved in aqueous alcohol with an alkali sulfite (e. g. sodium sulfite, potassium sulfite, etc.) to obtain the intermediate alkali metal alpha-(sulomethyl)-acrylonitrile, which compound is then suspended in an inert solvent, for example, in carbon tetrachloride and reacted with the calculated amount of phosphorus pentachloride, the product alpha-(chlorosulfonylmethyl)-acrylonitrile being isolated by fractional distillation of the reaction mixture.

To obtain the compounds of our invention which are represented by the general structural formula:

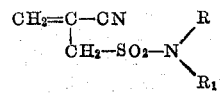

wherein R and $R_1$ have the previously defined meanings, the intermediate alpha-(chlorosulfonylmethyl)-acrylonitrile is treated with ammonia or a primary or secondary amine (e. g. methylamine, ethylamine, propylamine, butylamine, dimethylamine, dibutylamine, aniline, methylaniline, trifluoroethylamine, and so forth). The reaction can be carried out in an inert solvent medium at or below room temperature.

To obtain the compounds of our invention which are represented by the general structural formula:

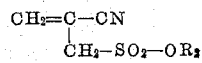

wherein $R_2$ represents an alkyl group containing from 1 to 4 carbon atoms, the intermediate alpha - (chlorosulfonylmethyl) - acrylonitrile is reacted with a saturated monohydric aliphatic alcohol containing from 1 to 4 carbon atoms (e. g. methanol, ethanol, propanol, butanol, etc.) in the presence of an organic nitrogen base (e. g. pyridine, quinoline, etc). The alcohol is first mixed with the acid chloride at a temperature of about 0° C. An inert solvent such as methylene chloride can advantageously be employed as a diluent for the reaction mixture. The tertiary nitrogen base is then added slowly with stirring while maintaining the temperature between 0 and 10° C., preferably not over 6° C. The mixture is then cooled and an excess of aqueous acid added. The product is recovered in the methylene chloride layer or by extraction with a water-insoluble solvent, followed by fractional distillation of the dried layer or extract. Although an excess of one or other of the reactants can be employed, the best results are obtained with equivalent molecular quantities of the reactants.

The polymerization of the new compounds of the invention alone or conjointly with one or more other unsaturated compounds is accelerated by heat, by actinic light and by polymerization catalysts which are known to promote the polymerization of vinyl and other unsaturated organic compounds such as peroxides e. g. benzoyl peroxide, acetyl peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali perborates, the water-soluble salts of percarbonic acid, the water-soluble salts of perphosphoric acid, etc. The organic peroxides are especially suitable. An effective polymerization catalyst is bis-azo-isobutyronitrile. Mixtures of catalysts can be employed. An activation agent such as sodium bisulfite can be used, if desired, in conjunction with the polymerization catalysts.

The polymerizations can be carried out in mass or dispersed in a non-solvent for the monomers, the particles of dispersed monomer being very small (emulsion) or relatively large (bead or granular). For emulsion polymerization, any non-solvent for the monomers can be employed, water being especially advantageous for the water-insoluble monomers. In this case the monomer or mixture of monomers can be advantageously emulsified in the water using emulsifying agents such as salts of higher fatty acids (e. g. sodium or potassium stearate, palmitate, etc.), ordinary soaps, salts of higher fatty alcohol sulfates (e. g. sodium or potassium cetyl sulfate, sodium or potassium lauryl sulfate, sodium or potassium stearyl sulfate, etc.), salts of aromatic sulfonic acids (e. g. sodium or potassium salts of alkylnaphthalene sulfonic acids, etc.) and higher molecular weight quaternary ammonium salts (e. g. dimethylbenzylphenyl ammonium chloride, quaternary salts containing the radicals $C_{15}H_{31}$ and $C_{17}H_{35}$, etc.). For bead or granular polymerization of the water-insoluble members of our invention relatively poor dispersing agents such as starch, methylated starch, gum arabic, polyvinyl alcohol, partly hydrolyzed polyvinyl acetate, gelatin, sodium glycolate, finely divided magnesium carbonate, etc. can be employed. Mixtures of dispersing agents can be used. In dispersion polymerizations stirring, shaking or tumbling give improved product and yield. The polymers of our invention wherein $R_2$ is an atom of alkali metal, for example, sodium alpha-sulfomethyl acrylonitrile, are soluble in water and can be polymerized in aqueous solution.

The new monomers of the invention can also be copolymerized with one or more other polymerizable unsaturates containing the basic vinyl group $CH_2=CH-$ to give valuable resinous polymers, for example, any of the new compounds with vinyl esters of carboxylic acids (e. g. vinyl acetate, vinyl butyrate, vinyl stearate, vinyl trifluoroacetate, vinyl benzoate, etc.), vinyl alkyl ketones (e. g. methyl vinyl ketone, ethyl vinyl ketone, trifluoromethyl vinyl ketone, etc.), vinyl alkyl ethers (e. g. methyl vinyl ether, ethyl vinyl ether, vinyl-$\beta$-trifluoroethyl ether, etc.), vinyl sulfonamides (e. g. vinyl sulfonamide, N-methyl-vinyl sulfonamide, etc.), vinyl chloride, bromide or fluoride, vinyl alkyl sulfones (e. g. vinyl methyl sulfone, vinyl ethyl sulfone, etc.), vinyl urethanes (e. g. vinyl methyl urethane, vinyl ethyl urethane, etc.), cyclic imides (e. g. vinyl succinimide, vinyl phthalimide, etc.), acrylic acid and its anhydride, amide, N-alkyl amides, nitrile, and the methyl, ethyl, butyl, benzyl and phenyl esters, ethylene, propylene, isobutylene, butadiene, styrenes (e. g. styrene, o- and p-methyl styrenes, 2,4-dichloro-$\alpha$-methyl styrene, o-acetamino styrene, etc.) and the like. The new monomers of the invention can also be copolymerized with one or more polymerizable unsaturates to resinous polymers, for example, with methacrylic acid and its anhydride, amide, N-alkyl amides, nitrile, and the methyl, ethyl, butyl, benzyl and phenyl esters, etc., alpha-acetoxy acrylonitrile, vinylidene dichloride, vinylidene chloride-fluoride, alkyl esters of maleic and fumaric acids such as methyl maleate, fumaronitrile, cis- and trans-$\beta$-cyano and carboxamido-methyl acrylates, and the like.

The copolymers of the invention can contain variable amounts of each comonomer and are obtained with starting polymerization mixtures containing from 5 to 95% by weight of the new unsaturates of the invention and from 95 to 5% by weight of one or more of the mentioned polymerizable vinyl and other known unsaturated compounds. The percentage composition of the copolymers is in general the same as the composition of the monomers in the polymerization mixtures.

The following examples will serve further to illustrate our new class of unsaturated compounds, polymers thereof, and the manner of their preparation.

*Example 1.—Alpha-(chlorosulfonylmethyl)-acrylonitrile*

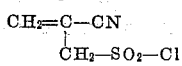

15 g. (approx. 0.1 mol) of alpha-bromomethyl acrylonitrile were dissolved in 200 cc. of a solution of 2 parts of ethanol and 1 part of water, and then 0.11 mol of sodium sulfite as a 22% aqueous solution was added dropwise at 50° C. The rate of addition was kept equal to the rate of the reaction. When the reaction was complete, the ethanol and water were distilled off under reduced pressure. The residue was extracted with 95% ethanol to give a crystalline solid, which on recrystallization from 95% ethanol had no definite melting point. This product analyzed 18.7% by weight of sulphur compared with the calculated theory of 18.9% of sulphur for the compound, sodium alpha-sulfomethyl acrylonitrile ($CH_2=C(CN)-CH_2SO_3Na$).

17 g. of sodium alpha-sulfomethyl acrylonitrile, prepared as above described, were suspended in carbon tetrachloride and reacted with the calculated amount of phosphorus pentachloride. When the reaction was complete, the phosphorus oxychloride by-product was removed under reduced pressure and the product, alpha-(chlorosulfonylmethyl)-acrylonitrile was obtained by fractional distillation of the residual reaction mixture. The product was a clear, colorless liquid, B. P. 92°–97° C./0.5 mm. pressure.

*Example 2.—Alpha-sulfonamidomethyl acrylonitrile*

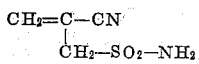

16.5 g. (0.1 mol) of alpha-(chlorosulfonylmethyl)-acrylonitrile were dissolved in 1,4-dioxane and cooled to 0° C. and 4 g. of ammonia (0.23 mol $NH_3$) added slowly. The ammonium chloride was filtered off and the dioxane removed by evaporation under reduced pressure. The sulfonamide product was obtained in excellent yield as a residual white, crystal compound. No definite melting point could be obtained. Analysis for sulphur gave 21.5% by weight compared with calculated theory of 21.9% of sulphur.

Example 3.—Alpha-(N,N-dimethylsulfonamido-methyl)-acrylonitrile

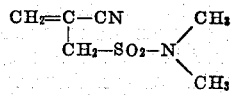

16.5 g. (0.1 mol) of alpha-(chlorosulfonylmethyl)-acrylonitrile were dissolved in dioxane, the solution cooled to 0° C. and 9 g. (0.2 mol) of dimethylamine were then added slowly over a period of 2 hours. The dimethylamine hydrochloride was removed from the reaction mixture by filtration. Fractionation of the filtrate gave a good yield of the sulfone amide product, B. P. 93°–99° C./0.01 mm. pressure.

Example 4.—Alpha-(methoxysulfonylmethyl)-acrylonitrile

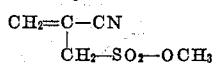

16.5 g. (0.1 mol) of alpha-(chlorosulfonylmethyl)-acrylonitrile and 3.1 g. (0.1 mol) of methanol were dissolved in 100 cc. of methylene chloride, the solution was cooled to 0° C. and 7.9 g. (0.1 mol) of pyridine were added slowly with stirring. The temperature was maintained at 3°–6° C. during the 30 minute period of the addition. The mixture was then allowed to come to room temperature, when 150 cc. of 6 Normal hydrochloric acid were added and the mixture thereafter thoroughly shaken. The methylene layer which formed was separated, washed with two successive 75 cc. portions of water, and then dried over anhydrous sodium sulfate. Frictional distillation of the dried methylene layer gave a good yield of the product, alpha-(methoxysulfonylmethyl)-acrylonitrile, B. P. 91°–95° C./0.1 mm. pressure.

Example 5.—Alpha-(butoxysulfonylmethyl)-acrylonitrile

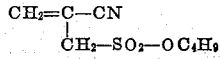

A solution of 16.5 g. (0.1 mol) of alpha-(chlorosulfonylmethyl)-acrylonitrile, 7.4 g. (0.1 mol) of butanol and 115 cc. of methylene chloride was cooled to 0° C. There were then slowly added with stirring 7.9 g. (0.1 mol) of pyridine over a 45 minute period, while the temperature was maintained at 2°–6° C. The mixture was then allowed to come to room temperature. 150 cc. of 6 Normal hydrochloric acid were added, and after thorough shaking, the methylene chloride layer which separated was washed with two 75 cc. changes of water and dried over anhydrous sodium sulfate. The product, alpha-(butoxysulfonylmethyl)-acrylonitrile, was obtained by fractional distillation of the methylene layer. It had a boiling point of 115°–119° C./0.1 mm. pressure.

Example 6.—Polymer of sodium alpha-sulfomethylacrylonitrile 5 g. of sodium alpha-sulfomethylacrylonitrile and 0.2 g. of potassium persulfate were dissolved in 20 cc. of water. Polymerization was completed by heating the mixture at 70° C. for a period of 12 hours. A clear, viscous solution was obtained.

Example 7.—Polymer of alpha-(chlorosulfonylmethyl)-acrylonitrile 5 g. of alpha-(chlorosulfonylmethyl)-acrylonitrile and 0.2 g. of benzoyl peroxide were placed in a sealed tube and heated at 80° C. for a period of 24 hours. A brown, hard polymer, soluble in dimethyl formamide, was obtained. On treating the polymer with water, it was slowly converted to a water-soluble polymer.

Example 8.—Polymer of alpha-(sulfonamidomethyl)-acrylonitrile 5 g. of alpha-(sulfonamidomethyl)-acrylonitrile were placed in a glass tube and heated at 200° C. for a 10 minute period. The polymer was obtained. The polymer was soluble in dimethyl formamide and in dimethyl acetamide, and had a softening point above 170° C.

Example 9.—Polymer of alpha-(N,N-dimethylsulfonamidomethyl)-acrylonitrile 5 g. of alpha-(N,N-dimethylsulfonamidomethyl)-acrylonitrile and 0.3 g. of bis-azo-isobutyronitrile were placed in a sealed tube and heated at 80° C. for a period of 24 hours. A clear, hard and moldable polymer, soluble in acetone and in acetonitrile, was obtained.

Example 10.—Polymer of alpha-(methoxysulfonylmethyl)-acrylonitrile 5 g. of alpha-(methoxysulfonylmethyl)-acrylonitrile and 0.2 g. of acetyl peroxide were placed in a sealed tube and heated at 50° C. for 24 hours. A clear, hard polymer, soluble in acetone, was obtained.

Example 11.—Polymer of alpha-(butoxysulfonylmethyl)-acrylonitrile 10 g. of alpha-(butoxysulfonylmethyl)-acrylonitrile and 0.3 g. of benzoyl peroxide were placed in a sealed tube and heated at 80° C. for 48 hours. A clear, hard polymer, soluble in acetone, was obtained.

Example 12.—Copolymer of alpha-(sulfonamidomethyl)-acrylonitrile and acrylonitrile 2 g. of alpha-(sulfonamidomethyl)-acrylonitrile, 8 g. of acrylonitrile, 0.2 g. of ammonium persulfate, 0.2 g. of sodium bisulfite and 2 g. of potassium laurate were added to 100 cc. of distilled water. Polymerization began immediately and was complete within 8 hours. The polymer precipitated from solution and was isolated by filtration. It was soluble in dimethyl formamide and in dimethyl acetamide, and had a softening point above 190° C.

Example 13.—Copolymer of alpha-(methoxysulfonylmethyl)-acrylonitrile and styrene 4 g. of alpha-(methoxysulfonylmethyl)-acrylonitrile and 8 g. of styrene were added to 50 cc. of distilled water containing 1 g. of potassium laurate, 0.2 g. of potassium persulfate and 0.2 g. of sodium bisulfite. Polymerization was carried out by heating at 50° C. for 12 hours. The polymer was precipitated by the addition of a saturated salt solution. It was soluble in acetone.

Example 14.—Copolymer of alpha-(butoxysulfonylmethyl)-acrylonitrile and butadiene-1,3

2 g. of alpha-(butoxysulfonylmethyl)-acrylonitrile, 8 g. of butadiene, 0.2 g. of ammonium persulfate, 0.2 g. of sodium bisulfite and 2 g. of potassium laurate were added to 75 cc. of distilled water. Polymerization began immediately and was complete within 12 hours. The polymer was precipitated by the addition of a saturated salt solution. The resultant polymer was a rubber which was soluble in methyl ethyl ketone.

*Example 15.—Copolymer of alpha-(chlorosulfonylmethyl)-acrylonitrile and methyl acrylate*

2 g. of alpha-(chlorosulfonylmethyl)-acrylonitrile, 8 g. of methyl acrylate and 0.3 g. of benzoyl peroxide were placed in a sealed tube and heated at 60° C. for a period of 24 hours. A clear, rubbery polymer, soluble in acetone was obtained.

*Example 16.—Copolymer of alpha-(methoxysulfonylmethyl)-acrylonitrile and styrene*

9.5 g. of alpha-(butoxysulfonylmethyl)-acrylonitrile, 0.5 g. of butadiene, 0.2 g. ammonium persulfate, 0.2 g. sodium bisulfite and 2 g. potassium laurate were added to 100 cc. of distilled water. Polymerization began immediately and was complete within 16 hours. The emulsion was broken by the addition of a saturated salt solution. The polymer was filtered, washed and dried. It was soluble in acetonitrile.

*Example 17.—Copolymer of alpha-(methoxysulfonylmethyl)-acrylonitrile and styrene*

9.5 g. of alpha-(methoxysulfonylmethyl)-acrylonitrile, 0.5 g. of styrene and 0.1 g. of acetyl peroxide were placed in a sealed tube and heated at 50° C. for 24 hours. A clear, hard polymer, soluble in acetone, was obtained.

*Example 18.—Copolymer of alpha-(sulfonamidomethyl)-acrylonitrile and acrylonitrile*

9.5 g. of alpha-(sulfonamidomethyl)-acrylonitrile and 0.5 g. acrylonitrile were added to 100 ml. of water containing 0.2 g. sodium bisulfite and 0.2 g. ammonium persulfate. Polymerization began immediately and was complete within 16 hours. A clear viscous solution resulted. The water-soluble polymer can be precipitated by the addition of acetone.

*Example 19.—Copolymer of alpha-(methoxysulfonylmethyl)-acrylonitrile and methyl methacrylate*

9 g. of alpha-(methoxysulfonylmethyl)-acrylonitrile, 1 g. of methyl methacrylate and 0.3 g. benzoyl peroxide were placed in a sealed tube and heated at 50° C. for 24 hours. A clear, hard, polymer soluble in acetone, was obtained.

*Example 20.—Copolymer of alpha-(butoxysulfonylmethyl)-acrylonitrile and vinyl acetate*

9 g. of alpha-(butoxysulfonylmethyl)-acrylonitrile, 1 g. of vinyl acetate and 0.3 g. of benzoyl peroxide were placed in a sealed tube and heated at 80° C. for 48 hours. A clear, hard polymer, soluble in acetone, was obtained.

Other valuable resinous copolymers can also be prepared from polymerization mixtures containing, for example, 5%, 15%, 25%, 40%, 50%, 60%, 70% and 80% by weight of one or more of the new unsaturates of the invention, the remainder of the polymerizable materials in each case being one or more of the other unsaturates mentioned as being suitable. The polymers and copolymers of the invention are soluble in one or more volatile solvents including acetone, acetonitrile, dimethyl formamide, dimethyl acetamide, methyl ethyl ketone, and in the case of polymeric alpha-(chlorosulfonmethyl)-acrylonitrile and the alkali-metal alpha-sulfomethyl acrylonitriles, solubility also in water. Such solutions or dopes can be employed for preparing sheet materials and as treating and impregnating compositions for fibrous materials. Fillers, dyes, plasticizers can also be employed in such solutions. The solutions containing copolymers wherein the other unsaturate is acrylonitrile are especially useful for extrusion in the form of filaments from which yarns can be spun. The polymers and copolymers of the invention which have relatively high softening points are also valuable for the preparation of molding compositions.

What we claim is:

1. A polymer selected from the group consisting of a homopolymer of a substituted methacrylonitrile represented by the following general formula:

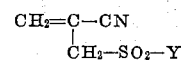

wherein Y represents a member selected from the group consisting of an atom of chlorine, the group

wherein R represents a member selected from the group consisting of a hydrogen atom and an alkyl group containing from 1 to 4 carbon atoms, the group —OR₁ wherein R₁ represents an alkyl group containing from 1 to 4 carbon atoms, and the group —OX wherein X represents an alkali metal atom, and a copolymer of from 5 to 95% by weight of the said substituted methacrylonitrile and from 95 to 5% by weight of a polymerizable monomer selected from the group consisting of a vinyl compound containing a single CH₂=CH-group, and an alkyl methacrylate.

2. A polymer selected from the group consisting of a homopolymer of a substituted methacrylonitrile represented by the following general formula:

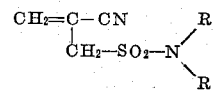

wherein R represents a member selected from the group consisting of a hydrogen atom and an alkyl group containing from 1 to 4 carbon atoms, and a copolymer of from 5 to 95% by weight of the said substituted methacrylonitrile and from 95 to 5% by weight of a polymerizable monomer selected from the group consisting of a vinyl compound containing a single CH₂=CH-group, and an alkyl methacrylate.

3. A polymer selected from the group consisting of a homopolymer of a substituted methacrylonitrile represented by the following general formula:

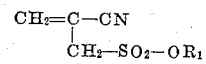

wherein R₁ represents an alkyl group containing from 1 to 4 carbon atoms, and a copolymer of from 5 to 95% by weight of the said substituted methacrylonitrile and from 95 to 5% by weight of a polymerizable monomer selected from the group consisting of a vinyl compound containing a single CH₂=CH-group, and an alkyl methacrylate.

4. A polymer selected from the group consisting of a homopolymer of a substituted methacrylonitrile represented by the following general formula:

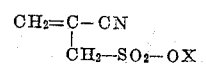

wherein X represents an alkali metal atom, and a copolymer of from 5 to 95% by weight of the said substituted methacrylonitrile and from 95 to 5% by weight of a polymerizable monomer selected from the group consisting of a vinyl compound containing a single $CH_2=CH$-group, and an alkyl methacrylate.

5. Poly - alpha - (chlorosulfonylmethyl) - acrylonitrile.

6. Poly - alpha - (sulfonamidomethyl) - acrylonitrile.

7. A copolymer of from 5 to 95% by weight of alpha - (sulfonamidomethyl) - acrylonitrile and from 95 to 5% by weight of acrylonitrile.

8. A copolymer of from 5 to 95% by weight of alpha - (methoxysulfonylmethyl) - acrylonitrile and from 95 to 5% by weight of styrene.

9. Poly - alpha - (N,N - dimethylsulfonamidomethyl) -acrylonitrile.

References Cited in the file of this patent

UNITED STATES PATENTS

| Number | Name | Date |
|---|---|---|
| 2,527,300 | Dudley | Oct. 24, 1950 |